US012068539B2

(12) United States Patent
Zhou et al.

(10) Patent No.: US 12,068,539 B2
(45) Date of Patent: Aug. 20, 2024

(54) PUSH-PULL MULTI COAX CONNECTOR USED FOR 5G COMMUNICATION REPEATER

(71) Applicant: ANOISON ELECTRONICS LLC, Portsmouth, NH (US)

(72) Inventors: Weiquan Zhou, Portsmouth, NH (US); Xiaobing Yang, Portsmouth, NH (US)

(73) Assignee: Anoison Electronics LLC, Portsmouth, NH (US)

( * ) Notice: Subject to any disclaimer, the term of this patent is extended or adjusted under 35 U.S.C. 154(b) by 509 days.

(21) Appl. No.: 17/404,880

(22) Filed: Aug. 17, 2021

(65) Prior Publication Data

US 2022/0407239 A1 Dec. 22, 2022

(30) Foreign Application Priority Data

Jun. 21, 2021 (CN) ......................... 202110702278.3

(51) Int. Cl.

| | |
|---|---|
| ***H01Q 1/00*** | (2006.01) |
| ***H01Q 1/50*** | (2006.01) |
| ***H01Q 21/00*** | (2006.01) |

(52) U.S. Cl.

CPC ........... *H01Q 21/0006* (2013.01); *H01Q 1/50* (2013.01)

(58) Field of Classification Search

CPC ............................... H01Q 2/0006; H01Q 1/50

See application file for complete search history.

(56) References Cited

U.S. PATENT DOCUMENTS

| | | | | |
|---|---|---|---|---|
| 10,148,047 B2 | 12/2018 | Wimmer et al. | | |
| 2007/0037429 A1 * | 2/2007 | Scholler .............. | H01R 13/622 439/312 | |

* cited by examiner

*Primary Examiner* — Phuong Chi Thi Nguyen

(74) *Attorney, Agent, or Firm* — Hammer & Associates, P.C.

(57) ABSTRACT

A multi-core connector used for 5G communication repeater, in which as a 5-core connector, with respect to prior art, an overall diameter is reduced from 32-35 mm to about 24.10 mm; the maximum external diameter is reduced from about 39.73 mm to about 27.70 mm, increasing an adaptive frequency from DC-20 GHz to DC-40 GHz to meet a demand of mmWave; an outer conductor of a female connector and that of a male connector abut against each other, so a gap possibly existed in the prior art is cancelled in a contacting interface, so as to enhance a shielding effect; in order to improve a push-on accuracy and avoid a traditional blind mate, right orientation indicating marks are set on a cylindrical surface of the male connector and that of the female connector, respectively; at least two bayonets are arranged circumferentially on an outer insert guiding surface of a male connector shell, and grooves matched with the bayonets are arranged circumferentially on an inner receptacle guiding surface of a female connector shell; a cylinder surface of a coupling nut is provided with spiral grooves, thus after the bayonets enter the spiral grooves, once the coupling nut is rotated up to an angle, the plug and socket can be clicked.

7 Claims, 2 Drawing Sheets

PUSH-PULL MULTI COAX CONNECTOR USED FOR 5G COMMUNICATION REPEATER

TECHNICAL FIELD

The present invention relates to a multi-coax connector, in particular to a circular multi-core (such as 4-core or 5-core) integrated connector used for 5G relay or latency system, especially a quick-lock multi-pin-port connector, i.e., a push-on and pull-off connector with multiple signal paths, suitable to be used for a 5G communication repeater, thus reducing 5G deployment costs.

PRIOR ART

Until now, 5G communication network has not yet deployed as broad as possible with reasons as follows. 1) 5G application scenarios are not so much as possible; and 2) costs are relatively high. It is easy to understand that if maintaining performance of a 5G component or making less sacrifice thereof, the lower the cost for buying and using the 5G component, the wider the 5G network can be spread. In some areas where users are scattered and base stations have not effectively covered, low-power repeaters are used to introduce base station signals into the users' rooms to avoid establishing new base stations, thus reducing the cost for deploying 5G network.

A traditional 5G network repeater has five channel cables for an uplink horizontal signal, a downlink horizontal signal, an uplink vertical model, a downlink vertical model, and a clock signal, which need to be separately introduced into a mounting box, and connected through five separate connectors in the mounting box. Therefore, a workload for assembling and testing the connectors on site are relatively heavy, making a low assembling efficiency, a high labor cost, and a high human error rate.

Therefore, it is urgently needed for 5G relay system manufacturers to have such a 5-core connector that five channels can be quickly pushed-on, locked, unlocked, or pulled-off on site at the same time without using any tool, and has a good shielding effect (−90 dB min @6 GHz) and a small size (for example, the maximum diameter is less than 30 mm).

Unfortunately, it has been not yet available for any multi core connector that can meet the above requirements in the prior art with reasons as follows.

In a connector industry, it is difficult for designers to accept such an idea that a non-standard connector is specially designed for a specific application scenario. When designing a new type of connector, designers of the connector must consider those existed industry standards. They are afraid that users would not welcome the non-standard design, so that they are reluctant to carry out the non-standard design (usually, users do have such considerations, for they feel more feasible about a standardized design). The designers' and users' considerations include, but are not limited to, operating costs are low, sales volume is big, spare parts supply are never out of stock, profit is stable, and so on. With the above concept, with a limited scope of ideas of those skilled in the art, as there is no small size and high frequency 5-core connector in the existed industry standards, it is impossible for those skilled in the art to design a 5G relay system connector to meet the above requirements in the concept of prior art.

In fact, for the 5G relay system, if a special usage, low-cost, but high-performance multi-core connector is developed at first, making it recognized by users and then enrolled into the industry standards, it is more effective and helpful for a global communication network to upgrade from 4G to 5G. However, those skilled in the art do not work in this strategy, because it is opposite to a traditional commercial route, i.e. developing new products within framework of existed standards.

According to the above traditional doctrine for developing any new connector, NEX10-5 multi core connector, as the closest prior art product, might be used as a 5-core connector applied for the 5G relay system. However, it will bring the following technical problems:

1) NEX10-5 multi core connector is suitable for 5G base stations with a high power, but it is not ideal to be used in the 5G relay system with a low power, otherwise, the cost is high and the economy is poor.
2) NEX10-5 multi core connector also has a push-pull version. However, there are several stepped contacting interfaces between an outer conductor of a male connector and that of a female connector. Although the contacting between the two can be ensured, there is inevitably formed a gap resulted from a design solution or a manufacturing process, leading to a poor shielding effect (DC-3 GHz: −90 dB; 3 GHz to 6 GHz: −70 dB).
3) The maximum dimension of NEX10-5 multi core connector is up to about 39.73 mm, resulting in a large size, which leads to a heavy weight, an excessive mass of metal material, and a high material cost. Its adaptive frequency is only DC-20 GHz, limiting its application scope.
4) One of pride merits of NEX10-5 multi core connector is that it would perform a blind mating. However, one end connector might be turned up to a notable degree so as to mate with the other end connector. As a result, those cables behind the one end connector are forced to twist too much, and a friction or even a wear between an end face of the male connector and an end face of the female connector are increased. This is very detrimental to ensuring an expected performance of the connector.

Therefore, in order to accelerate a global popularization of 5G network, 5G communication repeater urgently needs a special 5-core connector with a lower cost but a better performance.

SUMMARY OF THE INVENTION

The first object of the present invention is to provide a multi-core connector appliable for a 5G communication repeater, which is more compact in structure and less size in external dimension, thereby reducing a weight of the connector, saving a metal material for making the connector, reducing a cost for using material for making the connector, increasing an adaptive frequency of the connector, and making more application scenarios for the connector.

The second object of the present invention is to provide a multi-core connector appliable for 5G communication repeater, which can easily ensure a foolproof connecting and avoid a traditional blind mating, so that those cables behind one end connector are no longer greatly twisted, so as to ensure a desired performance of the connector.

The third object of the present invention is to provide a multi-core connector appliable for 5G communication repeater, which eliminates a traditional gap inherently existed on each core connecting interface between an outer conductor of a male connector and that of a female connector, so as to enhance a shielding effect.

The fourth object of the present invention is to provide a multi-core connector appliable for 5G communication repeater, which can push on, turn to ignite a quick lock, and pull off.

Thus, according to the first aspect of the invention, there is provided a multi-core connector appliable for 5G communication repeater, wherein it is a 5-core connector or a 4-core connector, an external diameter of each core connector is reduced, and an overall diameter of the connector is also reduced, making the connector miniaturized and adapted to a broadened range of frequency.

Preferably, compared with a traditional 5-core connector, the overall diameter is reduced from 32-35 mm to about 24.10 mm; and the maximum overall diameter is reduced from about 39.73 mm to about 27.70 mm, reducing a weight of the connector, saving materials for making the connector, and lowing a cost for making the connector, which are very helpful for popularization of 5G.

Preferably, an adaptive frequency is increased from DC-20 GHz to DC-40 GHz to meet the millimeter wave demand.

Preferably, a radial flange is arranged on a shell of each core of one of a male connector and a female connector, and a steel spring is arranged between a front surface of the flange and a rear surface of an outer conductor element of the core connector, so as to allow a free compression or floating of the outer conductor element.

Preferably, an axially and solidly contacting interface for each core is arranged between an outer conductor of the male connector and an outer conductor the female connector in addition to traditional multiple contact surfaces, so as to eliminate any possible remaining gap for any core between the male connector and the female connector, thereby enhancing the shielding effect.

According to the connector of the invention, the maximum external dimension can be reduced to about 27.70 mm, obviously smaller than the maximum external dimension of NEX10-5, about 39.73 mm; the present inventors discover that the maximum overall dimension of the connector according to the invention can be further reduced, but it is preferred to a moderate maximum overall dimension in the invention, because too small dimension of the connector would increase a manufacturing cost thereof.

According to the connector of the invention, the adaptive frequency is increased up to DC-40 GHz. Compared with the adaptive frequency DC-20 GHz of the NEX10-5 connector, the adaptive frequency of the invention can be increased to twice of the NEX10-5 connector.

According to the second aspect of the invention, there is provided a multi-core connector, wherein aligning marks for indicating correct orientation to ensure a foolproof connection are set on a cylindrical surface of a male connector and on that of a female connector, respectively, to improve an accuracy to perform one-time successful insertion, and avoid a traditional blind mating, so that it is possible to accurately push on after substantially aligning the male connector with the female connector along a circumferential direction of the connector. Therefore, it only needs to regulate one end connector in circumferential direction slightly, or it even does not need to turn the one end connector at all, to accurately connect the other end connector, and avoid any broad torsion of each core cable behind the one end connector, which makes the connector assembly on-site more convenient, thus helpful to ensure the predetermined performance of the connector.

Preferably, the foolproof connection guiding mark is a color dot, a color line, or a color arrow.

Preferably, the color is red, blue, yellow, or any other eye-catching color.

According to the third aspect of the invention, there is provided a multi-core connector appliable for 5G communication repeater, wherein a chord plane is arranged on a shell of a male connector or a female connector, and the chord plane contacts with a flat surface of a connector mounting hole on a connector mounting box, so as to eliminate a symmetry of the connector shell along its circumferential direction, and prevent any accidental sway of the connector after it is installed, thus a posture of the connector along its circumferential direction is uniquely determined.

According to the fourth aspect of the invention, there is provided a multi-core connector appliable for 5G communication repeater, wherein a positioning pin deviating from a longitudinal axis of the connector is arranged eccentrically on end surface of one of a male connector and a female connector, and a positioning hole to be matched with the positioning pin is arranged eccentrically on end surface of the other one of the male connector and the female connector; the positioning pin and the positioning hole have an automatically aligning mechanism, an inserting tip of the positioning pin has a hemispherical end, and a receiving mouth of the positioning hole has a chamfer or rounding; when the positioning pin and the positioning hole are in engagement with each other, a circumferential position of the male connector relative to the female connector is unique, thus eliminating any human error for mating the connector.

Preferably, the positioning pin deviating from the longitudinal axis of the connector is arranged on the end surface of the male connector, while the positioning hole to be matched with the positioning pin is arranged on the end surface of the female connector; or, the positioning hole deviating from the longitudinal axis of the connector is arranged on the end surface of the male connector, while the positioning pin to be matched with the positioning hole is arranged on the end surface of the female connector.

The present invention gets rid of a traditional bias in implementing rules of normalization and standardization, and develops a specific non-standard connector for a specific application scenario, so that a size of the inventive connector can be made smaller, and an adaptive frequency thereof becomes higher, which not only reduces a weight of the connector itself, reduces a cost for packaging and transporting the inventive connector, but also saves a metal material for manufacturing the connector and save a cost for obtaining the material for making the connector.

In prior art, a term "blind mate" is often used as a merit on some advertisement. Contrary to the prior art, the present invention does not recommend, advocate, or suggest the blind mating between the male and female connectors. Instead, the invention can improve an accuracy to finish one-time successful insertion, ensure foolproof connection, and prevent from the traditional blind mating by setting marks, such as red dot, red line, red arrow, etc. on the cylindrical surfaces of the male connector and the female connector. It enables those employees for assembling the connector on-site to basically align a relative position between the male connector and the female connector along their circumferential direction of the connector at first, and then finish a precise insertion. Therefore, it only needs a little bit of rotation (i.e. the invention can be used to perform blind mate, but does not advocate the blind mate; the invention reduces a blindness for trying any luck, but proposes a new concept of "at first aligning, then pushing on", making a foolproof connection as soon as possible), or even without turning one end connector, to guide one end connector to precisely push on the other end connector, which makes an assembly on-site more convenient, and avoids a traditional drawback, i.e. turning one end connector by a possible large margin to try the employee's luck to push on the other end connector.

According to the connector of the invention, before pushing on, a turning range of one end connector can be very small, avoiding any large twisting of those core cables behind the one end connector, reducing friction and wear between the end surface of the male connector and that of the female connector, which is very helpful to ensure the expected performance of the connector.

According to the connector of the invention, the positioning pin which deviates from a center of the connector is provided eccentrically on one of the male connector end face and the female connector end face, and the positioning hole matching the positioning pin is arranged eccentrically on the other one of the male connector end face and the female connector end face; the positioning pin and the positioning hole have an automatically aligning mechanism, an inserting tip of the positioning pin has a hemispherical end, while a receiving mouth of the positioning hole has a chamfer; in a condition that the positioning pin and the positioning hole are mutually matched, the position of the male connector is unique in its circumferential direction relative to the female connector, which eliminates any possibility of a wrong signal path connection. The inventive connector is greatly simplified compared with the prior art, and has a further confirmation step to ensure foolproof connection on the basis of the inventive two connector correctly aligning marks.

Preferably, at least two bayonets (preferably three) are arranged circumferentially on an outer insert guiding surface of a male connector shell, while a guiding groove to be matched with each bayonet is arranged circumferentially on an inner receptacle guiding surface of a female connector shell.

Preferably, on a cylindrical surface of a connecting sleeve/coupling nut, there is provided with a few spiral grooves. After the bayonets enter into the spiral grooves, once the coupling nut is rotated up to an angle, the female connector and the male connector can be stably locked.

According to the invention, by adopting a steel spring to allow a compressing or floating, an inherent gap between an outer conductor of the male connector and that of the female connector in the traditional push-pull version of the connector is eliminated thus enhancing a shielding effect.

According to the invention, a chord plane is arranged on a shell of one end connector, which is used to prevent any accidental sway of the connector after it is fixed on a side wall of a mounting box, so as to determine unique posture of the connector.

It is sufficient for the inventive PA-5 five-core circular connector to meet the urgent market needs of SUB-6 application, and reach a shielding performance requirement of −90 dB min, and can quickly push on and pull off. Compared with a traditional corresponding connector, it can save a lot of testing and assembling time on site.

According to the invention, it gets rid of a traditional standardized concept, overcomes a bias in prior art, and brings an ideal solution for a low power application scenario which usually has no requirement for PIM, so a size of the connector could be designed as small as possible, thus bringing technical and economic beneficial effects, and contributing for the popularization of 5G.

The overall diameter of NEX10-5 connector is 32-35 mm, and the maximum overall diameter is about 39.73 mm, while the overall diameter of PA-5 connector can be greatly reduced to about 24.10 mm, and the maximum overall diameter is only about 27.70 mm. It provides a much smaller multi-core connector with a higher frequency, reaching 40 GHz to meet a future mmWave demand.

According to the invention, at least two spiral grooves are provided on the connecting sleeve. After the bayonets (guiding pins/protrusions) enter into the grooves, once the connecting sleeve is screwed up to a certain angle, the female connector and the male connector are locked with each other, that is, a stable push on is formed.

The invention breaks a traditional prejudice of "any new product must meet standards" in the prior art, that is, a structure and size of a new connector must meet available standards, useful for both base stations and repeaters. The invention designs a special connector for the repeater, breaks away from a traditional idea, and creates a new commercial route of "making a new product commercialized at first, then trying to have it standardized", which usually is not an idea for those skilled in the art at all, and is also nonobvious for them.

The PA-5 connector according to the invention can be used to a multipath coaxial transmission system with a high frequency. After the correct mate guiding marks are aligned with each other, it is conducive to rapid and accurate connection, and ensure foolproof connection. The PA-5 connector can be assembled more easily without using any tool on site, and will not cause any distortion of the cables. The frequency coverage can reach up to DC-40 GHz, very conducive to be used to a low-power relay system which is in a limited assembling space and requires a rapid push on and pull off.

BRIEF DESCRIPTION OF ACCOMPANYING DRAWINGS

BEST MODE FOR CARRYING OUT THE INVENTION

Figure 1A:
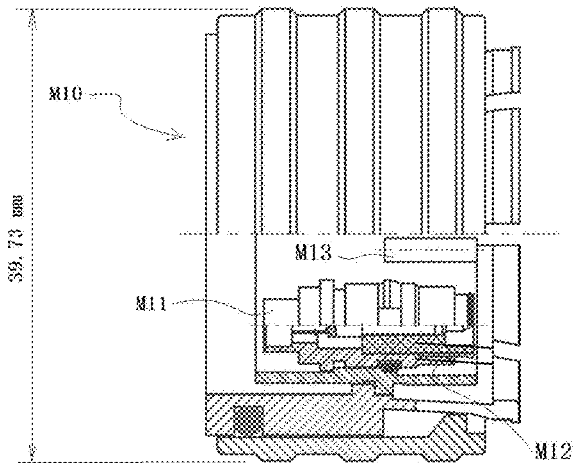
FIG. 1A and FIG. 1B are section views of a male connector and a female connector, respectively, of NEX10-5 multi-core connector according to the prior art.
Figure 1B:
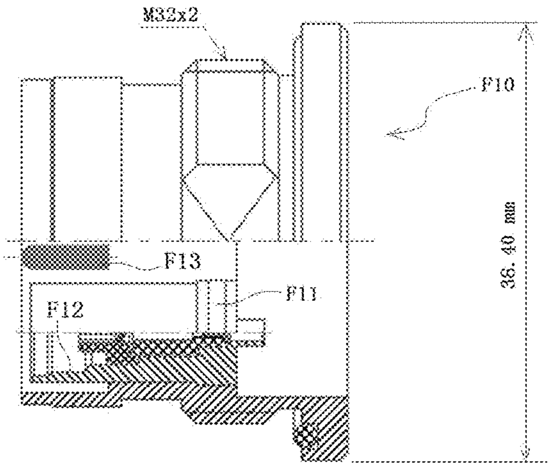

As shown in FIGS. 1A and 1B, in the prior art, the NEX10-5 multi core connector includes a male connector M10 and a female connector F10. The male connector M10 has five male connector cores M11 distributed circumferentially, while the female connector F10 has five female connector cores F11 distributed circumferentially. Each male connector core M11 is designed to be inserted into a corresponding female connector core F11.

In order to meet some industry standards, rather than technical requirements, an overall diameter of NEX10-5 multi core connector is determined to be 32-35 mm, and the maximum overall diameter is designed to be about 39.73 mm. However, it is difficult for those skilled in the art to rationalize and optimize the overall diameter of NEX10-5 connector from a technical point of view, in order to be used to a 5G network relay system, because if so, it would violate from the standards.

In an outer conductor of each male connector core M11, there is arranged an outer contact surface M12 shaped as a stepped cylindrical tower, while in an outer conductor of each female connector core F11, there has an inner contact surface F12 shaped as a stepped cylindrical tower. In theory, the stepped cylindrical tower outer contacting surface M12 and the stepped cylindrical tower inner contacting surface F12 fully abut against each other (a NEX10-5 threaded version can have no gap in the interface, but users wish to use the push-pull version with merits of quickly and conveniently connecting without any tool). However, for the NEX10-5 push-pull version of the connector, due to flatness and tolerance, etc. objectively resulted from machining, it is hard to avoid a contacting defect somewhere in the contacting surfaces, or even there are adjacent gaps at an end of the stepped cylindrical tower contacting surface M12 or at an end of the stepped cylindrical tower contacting surface F12 in their assembly status due to the flatness and tolerance originally arranged in design or inherently resulted from mechanical machining. This leads to a poor shielding performance (so called isolation, RF leakage, shielding or screening effectiveness) of NEX10-5 connector, so that NEX10-5 is not suitable to be used in a 5G network relay system.

The male connector M10 has an eccentric socket M13, and the female connector F10 has an eccentric pin F13. However, there is no automatically aligning mechanism between the eccentric pin F13 and the eccentric socket M13.

The doctrine for developing the NEX10-5 connector is to follow a traditional design rule on standardization of structure and size. An original intention for any product standardization is to reduce a manufacturing cost, a sales cost and a using cost for a product by increasing usage thereof. However, no industry standard for 5G network connector has been widely adopted, and no connector for 5G network base station and/or repeater has been widely used.

In fact, the 5G network has not yet covered a large enough area with reason as follows. First, those scenes suitable to use 5G are not wide enough. Second, a component cost for deploying the 5G network is high. Third, development of multi-core connector and other components has been confined within an idea, i.e. a standardization doctrine, for a long time, making it difficult for designers to imagine to develop a new multi-core connector for 5G relay system, which is with a low-cost, a better performance, a convenient assembly, preventing from trying any employee's luck, i.e. the traditional blind mating.

In the United States, millimeter wave solutions were often used before. Customized cables and connectors need to meet the 27/28 GHz for the millimeter wave, so it is difficult for their cost to be greatly reduced. When making design of the second generation connector, the frequency requirements are lowered to adopt SUB-6 (6 GHz) frequency, so as to greatly reduce a commercial cost of the connector. This opens up a business opportunity for implementing the present invention.

It is easy to understand that the lower a cost for obtaining the connectors, the wider the 5G network can be spread with a same performance or less sacrifice. However, in deploying the 5G communication network, there is not yet a low-cost and good performance multi-core connector product used in the 5G relay system. However, if those connectors originally designed for base stations are directly used in the 5G relay system, a higher cost is incurred for deploying the 5G communication network, thus inhibiting the communication network transformed from 4G to 5G.

Figure 2A:
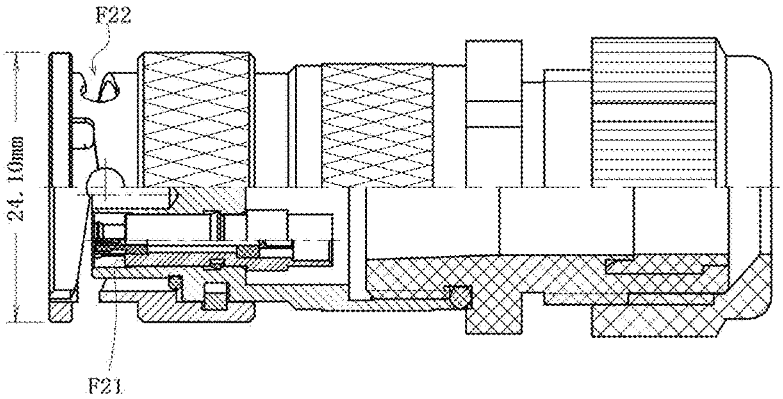
FIG. 2A and FIG. 2B are partial sectional view and end surface view of a female connector of PA-5 multi-core connector according to the invention.
Figure 2B:
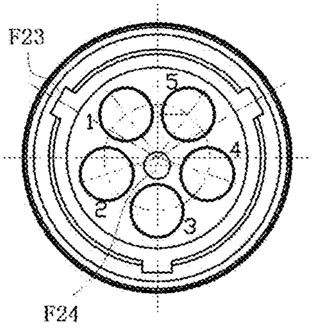

As shown in FIG. 2A and FIG. 2B, an additional front plane F21 is included to outer conductor contact surfaces of each female connector core. As long as this plane F21 abuts against an outer conductor contacting surface of the male connector core, any possible remaining gap is eliminated, so that the shielding effect can be improved. A reference sign F22 represents a spiral slot on a connecting sleeve/coupling nut; A reference sign F23 represents a bayonet of the male connector for mating a guiding groove; and a reference sign F24 represents an eccentric positioning hole.

Figure 3A:
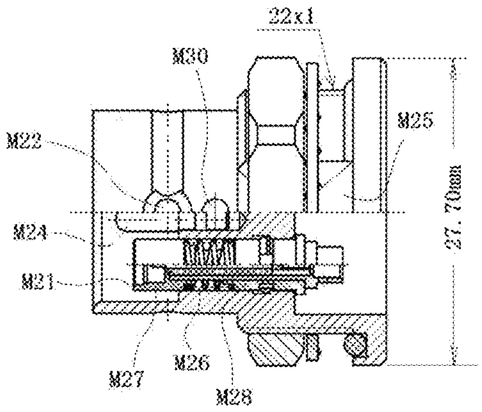
FIG. 3A and FIG. 3B are partial sectional view and end surface view of a male connector of PA-5 multi-core connector according to the invention.
Figure 3B:
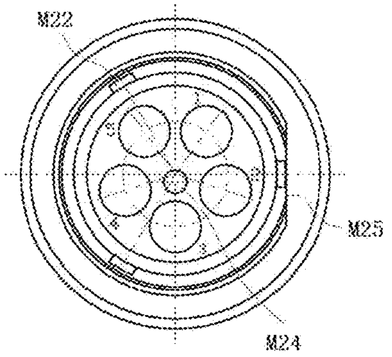

As shown in FIGS. 3A and 3B, an additional front plane M21 is provided to an outer conductor contacting surfaces of each male connector core. As long as this plane M21 abuts against an outer conductor contacting plane F21 of the female connector core so as to eliminate any possible remaining gap, the shielding effect can be improved. A reference sign M22 refers to a bayonet or a guiding pin; a reference sign M24 represents an eccentric positioning pin; a reference sign M25 refers to a chord plane; a reference sign M26 represents a clearance elimination spring; a reference sign M27 refers to an outer conductor contacting element of the male connector; a reference sign M28 represents a flange of the male connector housing or shell; and a reference sign M30 is an aligning mark set on an outer cylindrical surface the male connector to ensure foolproof connection.

Figure 4:
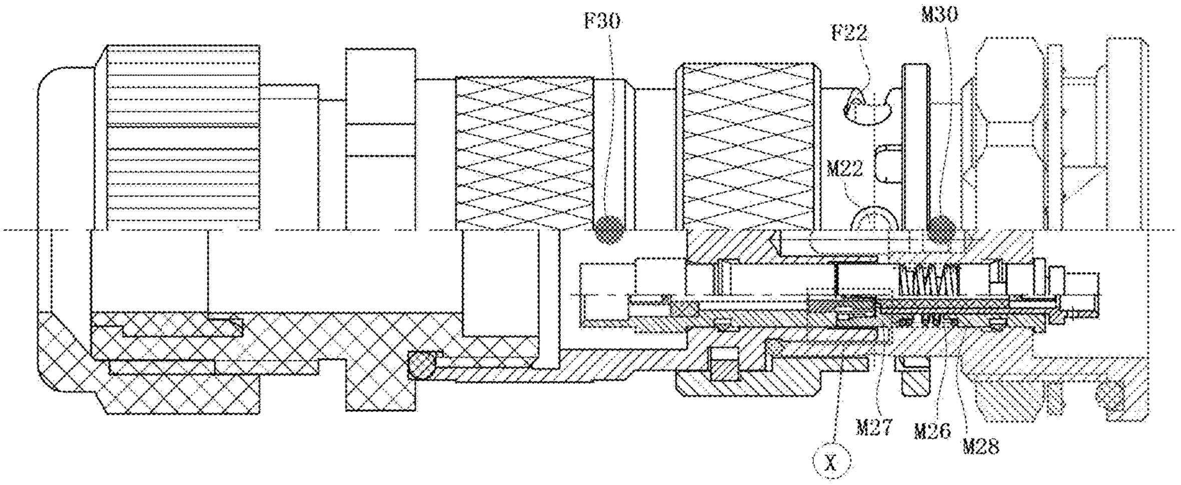
FIG. 4 is a partial sectional view of the PA-5 multi-core connector in a connecting state between the female connector and the male connector.

In FIG. 4, a reference sign M30 represents the aligning mark set on the male connector to perform a correct insertion; and a reference sign F30 indicates an aligning mark set on the female connector for accurately receiving an insertion. The bayonet/guide pin M22 is locked in the screw groove F22. The portion X will be magnified partially.

Figure 5:
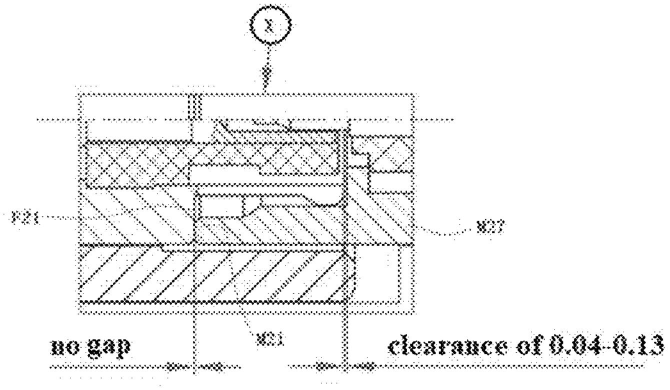
FIG. 5 is a schematic view of an enlarged part X marked in FIG. 4.

In FIG. 5, it is more clearly shown that the front plane M21 of the male connector core abuts against the outer conductor front plane F21 of the female connector core, and any possible gap left between the two is 0. Therefore, the shielding effect of the PA-5 multi-core connector according to the invention is improved.

As shown in FIGS. 1A, 1B, 2A and 3A, according to the first aspect of the invention, the multi-core connector is a 5-core connector or a 4-core connector; compared with a traditional 5-core connector, the overall diameter is reduced from 32-35 mm to about 24.10 mm; and the maximum overall diameter is reduced from about 39.73 mm to about 27.70 mm, thus reducing a weight of the inventive multi coax connector, saving a material for making the inventive multi coax connector, and reducing a cost for obtaining the inventive multi coax connector. The adaptive frequency of the inventive multi coax connector is increased from DC-20 GHz to DC-40 GHz so as to meet the demand of millimeter wave. Those are all very good for popularization of 5G.

As shown in FIGS. 3A and 4, according to the second aspect of the invention, the multi-core connector is designed to avoid a traditional blind mating, and set marks M30 and F30 on cylindrical surface of the male connector and that of the female connector, respectively, so that at first, the male connector and the female connector can be aligned circumferentially with each other, and then pushing one onto the other, so as to make it more possible to enjoy one-time successful insertion. It enables employees accurately push one connector on the other on site after substantially aligning a relative position between the male connector and the female connector in the circumferential direction of the connector. Therefore, it only needs to turn the female connector slightly, or even it does not need to adjust the female connector circumferentially, to mate with the male connector, so as to avoid a notable torsion of those core cables behind the female connector, and make the connector assembly more convenient. It helps to ensure the desired performance of the connector.

In FIGS. 3A and 4, the insertion guiding marks M30 and F30 are red dots. However, the marks can be an any color dot, an any color scale mark, or an any color arrow. The color is red, blue, yellow, or any other eye-catching color.

As shown in FIGS. 3A and 3B, according to the third aspect of the invention, the multi-core connector is provided with a chord plane M25 on a shell of the male connector, to contact with a side flat surface of a connector mounting hole arranged on a wall (not shown) of the connector mounting box, so as to eliminate a symmetry of the male connector shell along the circumferential direction, prevent any accidental sway of the male connector after it is installed on the wall, and make sure a single possible positioning of the male connector in the circumferential direction.

As shown in FIGS. 2A, 2B, 3A and 3B, according to the fourth aspect of the invention, a positioning pin M24 deviating from a longitudinal axis of the connector is arranged on the end surface of the male connector, and a positioning hole F24 to be matched with the positioning pin M24 is arranged on the end surface of the female connector. Moreover, the positioning pin M24 and the positioning hole F24 have an automatically aligning mechanism, an inserting tip of the positioning pin M24 has a hemispherical end, while the receiving mouth of the positioning hole F24 has a chamfer or rounding. When the positioning pin M24 and the positioning hole F24 are mutually matched, the position of the male connector relative to the female connector is circumferentially unique, eliminating any possibility of mis-mating connection.

As shown in FIGS. 3A and 4, according to the fifth aspect of the invention, the multi-core connector is provided with a radial flange M28 on a shell of each core male connector, and a steel spring M26 is arranged between a front surface of the flange M28 and a rear surface of an outer conductor element M27 of a core male connector, permitting a free compression or floating of the outer conductor element M27. In addition, axial contact ends M21 and F21 are added between a male connector outer conductor M27 of each core and a female connector outer conductor of this core in addition to traditional multiple contact surfaces M12 and F12, so as to eliminate a possible gap between each core male connector and a corresponding core female connector, thus improving a shielding performance.

According to the connector of the invention, the maximum overall dimension can be reduced to about 27.70 mm (FIG. 3A), which is significantly smaller than that of NEX10-5 (FIG. 1A). The maximum overall dimension of the connector according to the invention can be further reduced, but it is preferred to maintain a moderate maximum overall dimension in the invention, because too small dimension of the connector will increase a manufacturing cost thereof.

According to the connector of the invention, by setting orientation aligning marks for ensuring foolproof connection (FIG. 4), a traditional blind mate is avoided, and an accuracy of a one-time successful connection is improved. The installation workers can accurately mate two connectors on site after aligning circumferentially a relative position between the male connector and the female connector at first as precise as possible. Therefore, when only a small turn of the female connector is required, or even not required, the male connector can be inserted into the female one, which makes an on-site installation more convenient, and avoids a design defect of NEX10-5 multi-core connector, which may need to be inserted with the other end connector by rotating one connector up to a large margin.

According to the connector of the invention, the positioning pin M24 and the positioning hole F24 have an automatically aligning mechanism, which is a further confirming measure to guarantee the foolproof connection in addition to the two end connectors aligning marks M30, F30.

In short, compared with the prior art, for the 5-core connector according to the invention, its overall diameter is reduced from 32-35 mm to about 24.10 mm; its maximum external diameter is reduced from about 39.73 mm to about 27.70 mm, which increases the adaptive frequency from DC-20 GHz to DC-40 GHz to meet the demand of millimeter wave. By adopting the steel spring M26 to perform a compression or floating, the outer conductor contact interfaces M21, F21 between the female connector and the male connector are closely adhered to each other, so any possible remaining gap existing in the prior art is cancelled, and a shielding performance is improved. Correct mating marks M30, F30 are set on cylindrical surfaces of a male connector and a female connector, respectively, so as to avoid the prior art blind mating and improve an accuracy of one-time successful insertion. A chord plane M25 is arranged on a shell of the connector, making convenient for fixing the connector along the circumferential direction. At least two bayonets/guide pins M22 are arranged circumferentially on the outer insert guiding surface of the male connector shell, while a guide groove F23 matched with the guide pin M22 is arranged circumferentially on the inner receptacle guiding surface of the female connector shell. The cylinder surface of the connecting sleeve/coupling nut is provided with at least two spiral grooves F22. After the guide pins M23 enter the spiral grooves, once the connecting sleeve is rotated up to an angle, the female connector and the male connector can be firmly locked with each other.

The patentee of the invention is willing to incorporate the product according to the invention into an industry standard, and is also willing to cooperate with the international well-known connector companies to make new and greater contributions to a global popularization of 5G technology.

According to the above disclosure, those skilled in the art would be inspired to further modify, enhance and improve the invention. However, all of these will fall into the broad but reasonable scope of protection defined as the attached claims.

The invention claimed is:

1. A multi coax connector used for 5G communication repeater, wherein a claimed connector is a 5-core connector; compared with an overall diameter of a main body of a NEX10-5 multi core connector, an overall diameter of a main body of the claimed connector is reduced; and a maximum external diameter of a flange of the claimed connector is also reduced, making the claimed connector miniaturized with a higher adaptive frequency, compared with the overall diameter of the main body of the NEX10-5 multi core connector, the overall diameter of the main body of the claimed connector is reduced from 32-35 mm to 24.10 mm; the maximum external diameter of the flange of the claimed connector is reduced from 39.73 mm to 27.70 mm, so that the adaptive frequency is increased from DC-20 GHz to DC-40 GHz to meet a demand of a millimeter wave; at the same time, a weight of the main body of the claimed connector is reduced, a material for making the main body of the claimed connector becomes less, and a cost for manufacturing the main body of the claimed connector is lowered, so as to meet future demands of upcoming 5G networks.

2. The multi coax connector of claim 1, wherein marks for indicating a right orientation or ensuring a foolproof connection are provided on a cylindrical surface of a male connector and that of a female connector, respectively; the marks for ensuring right orientation are a color dot, a color scale, or a color arrow; the color is red, blue or yellow.

3. The multi coax connector of claim 1, wherein a chord plane is arranged on a shell of a male connector or a female connector, and the chord plane is in contact with a flat surface provided on a side wall of a D-shaped hole for mounting the connector on a mounting box, so as to destroy a symmetry of the shell of the connector circumferentially, and prevent any unexpected sway of the connector after it is installed on the mounting box, thus fixing the connector circumferentially, making the connector's orientation unique circumferentially, and eliminating human errors on-site.

4. The multi coax connector of claim 1, wherein a positioning pin which is eccentric to deviate from a longitudinal axis of the connector is arranged on an end face of one of a male connector and a female connector, and a positioning hole for mating with the positioning pin is eccentric on an end face of the other one of the male connector and the female connector; the positioning pin and the positioning hole have an automatic alignment mechanism, that is, an inserting tip of the positioning pin has a hemispherical end, and a receiving mouth of the positioning hole has a chamfer or rounding; when the positioning pin and the positioning hole is in engagement with each other, the male connector is circumferentially positioned in an unique orientation relative to the female connector, thus eliminating possibility of any mis-mating between the male connector and the female connector.

5. The multi coax connector of claim 4, wherein the positioning pin provided to deviate from the longitudinal axis of the connector is eccentric on the end face of the male connector, and the positioning hole to be matched with the positioning pin is eccentric on the end face of the female connector; or the positioning hole provided to deviate from the longitudinal axis of the connector is eccentric on the end face of the male connector, and the positioning pin to be matched with the positioning hole is eccentric on the end face of the female connector; or at least two bayonets are arranged circumferentially on an outer insert guiding surface of one end connector shell, and grooves to be matched with the bayonets are arranged circumferentially on an inner receptacle guiding surface of the other end connector shell; on a cylindrical surface of a coupling nut or sleeve, there are provided with at least two spiral grooves, thus after the bayonets enter the spiral grooves, once the coupling nut is rotated up to an angle, the male connector and female connector are locked with each other.

6. The multi coax connector of claim 1, wherein a flange extending radially is arranged on a shell of a core connector in one of a male connector and a female connector, and a spring is arranged between a front surface of the flange and a rear surface of an outer conductor element of the core connector, making a free compression or floating of the outer conductor element.

7. The multi coax connector of claim 6, wherein a full axially contacting interface is added for an outer conductor of the male connector of each core connector and for an outer conductor of the female connector of the core connector, so as to eliminate any possible contacting flaw or preset design gap between the outer conductor interface of the male connector of each core connector and the outer conductor interface of the female connector of the core connector, thus improving a shielding effect.

* * * * *